3,326,938
BETA-LACTONE PRODUCTION
Philip Lyle Wagner, Wilmington, Del., assignor to E. I. du Pont de Nemours and Company, Wilmington, Del., a corporation of Delaware
No Drawing. Filed Nov. 9, 1962, Ser. No. 236,694
10 Claims. (Cl. 260—343.9)

This invention relates to a novel improved process for the preparation of lactones. More particularly, the invention relates to a novel process for the intramolecular cyclization of β-halogenated carboxylic acids, which may additionally bear other substituents non-reactive under the conditions of cyclization, thereby producing β-lactones.

For many years, methods have been known for the conversion of β-halogenated carboxylic acids to lactones. For example, it has been known that β-halo acids can be converted to propiolactones by treatment in an aqueous alkaline medium. This and similar processes, however, are found to be unsatisfactory because the yields are poor, and the isolation of the resulting products can be accomplished only by time-consuming extraction procedures.

It is an object of this invention to provide an improved process for the conversion of β-halo acids to propiolactones, which may contain substituent groups of types which are inert to the conditions of preparation.

It is a still further object of this invention to provide a process for such conversions which permits the rapid and simple isolation of the desired product in high yield.

Other objects will become apparent from the specification and claims which follow.

In accordance with the objects of this invention, there is provided a novel improved process for the conversion of β-halogenated carboxylic acids to the corresponding lactones, which process comprises the steps of combining the halogenated acid with an inert high-boiling organic liquid medium and a weakly basic composition, maintaining the reaction mixture at an elevated temperature and at a reduced pressure, and distilling the resulting lactone from the reacting mixture as it is formed.

The conversion to the lactone and distillation are carried out at reduced pressures normally ranging from about 0.1 mm. to about 30 mm. mercury (absolute) and at elevated temperatures within the range from about 50° C. to about 150° C., although temperatures up to about 200° C. may be used. The use of temperatures materially above the upper limit recited causes an undue amount of degradation and decomposition of the lactone which is produced. Very low yields are obtained when the process steps of the present invention are carried out with chloro or bromo acids at temperatures substantially below about 50° C., although β-iodo acids react readily at room temperature. Unless reduced pressures are employed for the high temperature reaction, it is found that excessive decomposition occurs thereby reducing the yields to the point where the process is no longer feasible. Very high boiling lactones, for example those with a total of 17 carbon atoms, may require reduced pressures substantially below 0.1 mm. to be isolated in high yield.

The process of this invention may be employed for the conversion of any straight or branched chain β-halo carboxylic acid to the corresponding propiolactone, when said lactone is distillable. The acids may contain additional substituents of types which are substantially non-reactive under the conditions of conversion. Preferred β-halo acids are of the following generic formula:

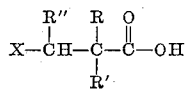

where X represents a halogen atom, particularly chlorine, bromine or iodine, of which chlorine and bromine are preferred; where R and R' (which may be the same) each represent an aromatic monovalent hydrocarbon radical of no more than eight carbon atoms, a lower alkyl radical of no more than eight carbon atoms, or a cycloalkyl radical of up to eight carbon atoms, no more than six of which are in the ring; the R and R' groups may, together with the carbon atom to which they are bonded, form a cyclic structure containing no more than six ring members and a total of no more than sixteen carbon atoms; and R" represents hydrogen or a lower alkyl monovalent radical containing no more than six carbon atoms. Thus, the β-halopropionic acids, the β-halobutyric acids, the β-halovaleric acids, the β-halocaproic acids, the β-haloheptylic acids, the β-halocaprylic acids, the β-halopelargonic acids, and the like containing two inert substituents on the α-carbon atom may be converted by the process of this invention to the corresponding β-lactones; among such substituents may be named lower alkyl or cycloaliphatic groups as methyl, ethyl, propyl, i-propyl, n-butyl, i-butyl, sec-butyl, pentyl, isopentyl, cyclopentyl, hexyl, isohexyl, cyclohexyl, and the like; aromatic groups as phenyl, tolyl, and the like; substituted groups as chloromethyl, nitromethyl, cyanomethyl, nitroethyl, cyanopropyl, nitrobutyl, cyanopentyl, and the like, and such ring-forming groups as tetramethylene, pentamethylene, and the like. A wide variety of acids could thus be satisfactorily employed in the process of this invention, including the following:

α,α-dimethyl-β-chloropionic acid,
α,α-diethyl-β-bromopropionic acid,
α-methyl-α-ethyl-β-iodopropionic acid,
α-methyl-α-nitromethyl-β-clhoropropionic acid,
α-ethyl-α-cyanomethyl-β-bromopropionic acid,
α,α-dipropyl-β-chloropropionc acid,
α-methyl-α-chloromethyl-β-bromopropionic acid,
α,α-dimethyl-β-chlorobutyric acid,
α,α-diethyl-β-chlorovaleric acid,
α,α-dipropyl-β-bromocaproic acid,
α-methyl-α-hexyl-β-bromoheptylic acid,
α-chloromethyl-α-methyl-β-chlorocaprylic acid,
α-ethyl-α-propyl-β-bromopelargonic acid,
α,α-pentamethylene-β-bromopropionic acid,
(1-bromomethylcyclohexanecarboxylic acid),
α,α-dicyclopentyl-β-bromopropionic acid,
α-methyl-α-phenyl-β-bromopropionic acid, and the like.

The improved process of this invention is conducted in the presence of a liquid medium, preferably comprising a high boiling, inert organic liquid. The primary purpose of this liquid medium is to serve as a diluent and heat-transfer agent, and its selection is based on certain criteria. While the exact proportion of reaction medium to reactant is not critical, it has been found that a weight ratio for diluent to reactant of between about 1:2 and about 2:1 is desirable for ease of operation consistent with obtaining reasonably high yields. It is required that the liquid medium be essentially anhydrous, that it be inert to the organic reactants and products under the conditions of cyclization, and that it be characterized by a boiling point at least about 50° C. higher than the boiling point of the lactone. Preferably the liquid medium will have a boiling point of at least about 225° C., when measured at atmospheric pressure. It is desirable that the medium be essentially neutral, having neither acidic nor basic characteristics, and it is advantageous for the liquid to be at least a partial solvent for the organic reactants.

The use of a liquid medium having a high dielectric constant accelerates the reaction and permits it to proceed at a lower temperature than does the use of liquid media having low dielectric constants. However, the latter may be employed completely satisfactorily. The organic liquids may be of any chemical type which is free of active hydrogen atoms, thus, they may not contain hydroxyl, carboxyl, amino, or other groups containing such active hydrogen atoms. Among suitable types of liquids which can be used as the reaction medium are the high-boiling hydrocarbons, halogenated hydrocarbons, esters, ethers, sulfones, and the like. The high boiling esters have been most commonly used because of their ready availability and relatively low cost. Examples of such suitable organic liquids are dibutyl phthalate, di-2-ethylhexyl sebacate, di-2-ethylhexyl phthalate, dioctyl phthalate, tetramethylene sulfone, halogenated biphenyls, and the like. In view of the fact that the liquid medium serves primarily as a diluent and heat transfer agent, it is obvious that a wide variety of inert materials may be employed with complete satisfaction.

As has previously been pointed out, the cyclization effected by the process of this invention is conducted in the presence of a weak base, whose primary function is to neutralize the starting $\beta$-halo carboxylic acid, converting it to the corresponding $\beta$-halo carboxylate ion. There is no critical lower limit on the concentration of weak base to be employed in the process. However, amounts substantially less than one equivalent of base per mol of acid will produce relatively low yields. The weakly basic materials of utility may be either organic or inorganic in nature, but they are preferably not volatile. Where solid materials which are not soluble in the liquid reaction medium are employed, it is preferred that they be extremely finely divided to make possible reduced reaction times and enhanced yields. It is necessary that basic material be present to the extent of at least one equivalent for each mol of starting $\beta$-halo carboxylic acid for complete conversion of the latter to the corresponding lactone, and it is desirable for a slight excess of the basic material to be employed, the excess ranging up to about 25%. Large excesses of the basic material may reduce the yield of lactone by causing side reactions of the lactone before it is removed. Among suitable weakly basic materials for use in the process of this invention are alkali or alkaline earth salts of weak acids such as sodium bicarbonate, potassium bicarbonate, and the like, sodium carbonate and other such alkali or alkaline earth carbonates, ammonia, the calculated quantity of ammonium hydroxide, basic amines and ion-exchange resins which contain tertiary amine groups, as "Amberlite" IR–401 (registered trademark), and the like. A strongly basic substance such as sodium hydroxide may be used in place of part of the weakly basic material. This is accomplished by partially neutralizing the $\beta$-halo acid with less than an equivalent of the strong base, followed by addition of sufficient weakly basic material to make the entire mixture slightly basic.

The process of this invention requires the addition of a suitable $\beta$-halogenated carboxylic acid, of the types previously described, and the appropriate quantity of a weakly basic material, as hereinabove discussed, to a high boiling, inert, organic liquid. The reaction mixture is normally permitted to stand for a period of from about 5 mintes to about 20 minutes to effect neutralization of the carboxylic acid groups to the corresponding carboxylate ions, preferably while vigorously stirring the mixture. The system in which the reaction is effected is then evacuated to a pressure of between about 0.1 mm. and about 30 mm., and external heating is begun. As the pressure in the system is reduced, there is a tendency to frothing of the reaction mixture when carbonates or bicarbonates are employed as the basic compositions, because of the carbon dioxide which is evolved. This phenomenon necessitates the periodic "bleeding" of air or other gaseous medium into the system to permit dispersal of the froth. When the tendency to frothing has ceased, evacuation to low pressures is continued, and the application of external heat is maintained over a period ranging from about 30 minutes to about 180 minutes. During this period, the temperature of the reacting mixture normally is brought to between about 80° C. and about 160° C., although temperatures as high as 200° C. may be used. During the same period, the temperature of the distilling vapors gradually rises and then declines when the majority of the product has been expelled from the reaction vessel. The course of the reaction may thus be followed by reference to the temperature of the distilling vapors. Alternatively, the course of the reaction may be followed by reference to the variation in internal pressure. This pressure increases during the evolution of any carbon dioxide, and during the distillation of the desired lactone; it then falls as the gaseous materials are withdrawn from the reaction vessel. The product is collected in one or more receiving flasks, cooled by any appropriate means. It is frequently desirable to employ three such receiving flasks in series, cooled by means of solid carbon dioxide. The product is thus removed from the reaction vessel substantially as soon as it is formed, and maintained at a temperature sufficiently low that there is little opportunity for it to be destroyed by polymerization or by degradation through hydrolysis or the like. In addition to the desired lactones, there is also recovered in the receiving flasks a minor proportion of the $\beta$-halogenated carboxylic acid starting material, and the expected quantity of water which is produced in the course of the reaction. Where such impurities interfere with the end uses of the desired $\beta$-lactone, isolation and purification of the product may be accomplished most readily by fractional distillation. A single such distillation of the contents of the receiving flasks is normally sufficient to produce the lactone in a high state of purity, in yields ranging as high as 85%.

It is equally possible to effect the conversion and distillation of $\beta$-halogenated carboxylic acids to the corresponding $\beta$-lactones by the process of this invention in a continuous manner. This is accomplished by adding to a heated organic liquid medium of the indicated class, a mixture of the appropriate quantities of the $\beta$-halo acid and the weakly basic composition, and withdrawing the vaporizing lactone that is produced. Unreacted starting materials may be collected and recycled for higher conversion.

It has long been recognized that $\beta$-lactones are highly reactive compositions, by virtue of their strained ring conformation and the presence of a reactive functional group within the ring. For this reason, it is desirable that the lactones not remain in contact with compositions with which they may react, particularly with hydrolyzing media at high temperatures. The process of this invention makes possible the preparation of $\beta$-lactones under conditions such that they are immediately removed from the presence of basic hydrolyzing substances and collected. These lactones are also readily hydrolyzed by water, and it is desirable that a minimum quantity of water be present during the course of the preparation. Small quantities of water are, however, inevitably present by virtue of the fact that this substance is a by-product of the lactone formation. The effect of this amount of water is minimized by carrying out the reaction in a relatively dilute solution in the organic solvent, and by freezing out that water which distills and is collected in the receiving flasks cooled below 0° C.

The following examples illustrate the present invention, but are not intended to limit it in any way. Numerous suitable modifications within the scope of the invention will be apparent to those skilled in the art.

*Example 1*

To 1500 grams of dioctyl phthalate, maintained at a temperature of 40° C., is added 1086 grams (6.0 mols) of bromopivalic acid, and the resulting solution is placed in a 5-liter reaction flask equipped with an efficient stirrer, a thermometer, and a distillation head. While rapidly stirring the solution, there is added 688 grams (8.2 mols) of finely divided sodium bicarbonate and stirring is continued under these conditions for a period of ten minutes. Evacuation of the system by means of an efficient pump is initiated, and external heat is applied to the reaction flask. During a period of approximately 80 minutes, the absolute pressure rises from a value of about 0.1 mm. to about 3.5 mm. of mercury then falls to approximately 0.5 mm., while the temperature of the reacting mixture rises slowly to about 120° C. As the distillation of the product nears completion, the temperature of the vapors in the distillation head falls from about 75° C. to about 55° C. The product is condensed and collected in three receiving flasks cooled with solid carbon dioxide. The $\alpha,\alpha$-dimethyl-$\beta$-propiolactone (also known as pivalolactone) is washed three times with saturated sodium chloride solution and fractionally distilled for purification. It boils within the range from about 44° C. to about 47° C. at an absolute pressure of 6 mm. of mercury and exhibits a refractive index at 25° C. of between 1.4050 and 1.4070. The product is isolated in 65% yield.

When the above experiment is carried out with 588 grams of sodium bicarbonate that has been finely divided in a hammer mill, the lactone is obtained in 70–75% yield.

Example II

By a procedure similar to that of the preceding example, a mixture comprising 18.1 grams (0.1 mol) of bromo-pivalic acid, 8.4 grams (0.1 mol) of finely divided sodium bicarbonate, and 200 ml. of Aroclor (a mixture of chlorinated biphenyls boiling at 365° C. at atmospheric pressure) is placed in a reaction flask and stirred vigorously. Evacuation of the system is begun, and periodic air bleeding is necessary for a period of about five minutes until the tendency to frothing is overcome. Evacuation is continued while the temperature of the reaction mixture is gradually raised to about 180° C. over a period of approximately 2½ hours. The products which distill from the reaction flask are collected in a receiving flask cooled with solid carbon dioxide, and the desired lactone is extracted into ether, dried, and recovered by evaporation of the ether. It is isolated in 65% yield, and is found to exhibit an infra-red spectrum characteristic of pivalolactone.

Example III

In a five-liter flask equipped with a thermometer, an addition funnel, and a distilling head are placed 336 grams (4.0 mols) of sodium bicarbonate and 2500 ml. of dibutyl phthalate. The system is evacuated and the temperature within the reaction flask is elevated to about 115° C. To this heated mixture is added 362 grams (2.0 mols) of bromopivalic acid, introduced from the addition funnel in a molten state and being retained in that state in the addition funnel by means of a heat lamp. The temperature of the reaction mixture is maintained within the range of from about 110° C. to about 120° C. during the addition of the molten material. The product is distilled from the reaction flask substantially as rapidly as it is formed and collected in a receiving flask cooled by means of solid carbon dioxide. The pivalolactone is isolated in 70% yield, and exhibits a refractive index at 24° C. of 1.4070.

Example IV

In a reaction flask are placed 27.3 grams (0.2 mol) of chloropivalic acid, 16.8 grams (0.2 mol) of sodium bicarbonate, and 125 ml. of dibutyl phthalate. By a procedure analogous to those of previous examples, the system is heated while evacuated, and the product is collected in a receiving flask cooled by means of solid carbon dioxide. The resulting pivalolactone is extracted into ether, dried over anhydrous magnesium sulfate, filtered, and isolated by evaporation of the ether. The product is isolated in 49% yield.

Example V

The general procedure describe in Example I can be utilized in preparing $\alpha,\alpha$-diethyl-$\beta$-propiolactone employing in place of the therein indicated reactants, 41.8 g. (0.2 mol.) $\alpha$-bromomethyl-$\alpha$-ethylbutyric acid and 18.5 g. (0.22 mol.) finely powdered sodium bicarbonate in 125 ml. di-2-ethylhexyl phthalate. A vacuum in the range of 0.6–4 mm. is maintained on the stirred mixture while the temperature is raised from 40° C. to 160° C. until distillation ceases. The material in the cold traps is maintained at a temperature between that of the solid carbon dioxide bath and 0° C. while being extracted with cold methylene chloride. The extract is filtered cold to remove ice crystals, dried with anhydrous magnesium sulfate, and distilled. After removal of the solvent, the pressure is reduced to 6 mm., and the $\alpha,\alpha$-diethyl-$\beta$-propiolactone is collected at a boiling point of 72° C. This lactone has a refractive index of 1.4261 at 25° C., and exhibits a sharp infrared absorption band at 5.48 microns, this band being characteristic of $\beta$-lactones.

Example VI

The procedure of Example V may be followed, using 39.0 g. (0.2 mol.) $\alpha$-bromomethyl-$\alpha$-methylbutyric acid, 21.0 g. (0.25 mol.) sodium bicarbonate powder, and 125 ml. di-2-ethylhexyl phthalate. Distillation of the product isolated from the cold traps by extraction with methylene chloride yields $\alpha$-ethyl-$\alpha$-methyl-$\beta$-propiolactone, boiling point 70–75° C. at 17 mm., $n_D^{25}=1.4160$ sharp infrared absorption band at 5.48 microns.

Example VII

The procedure of Example V can be utilized in effecting a reaction between 44.2 (0.2 mol.) 1-bromomethyl-cyclohexane-1-carboxylic acid and 18.5 g. (0.22 mol.) finely ground sodium bicarbonate in 125 ml. of di-2-ethylhexyl phthalate. The temperature of the reaction mixture is slowly increased from 40° C. to 180° C. over a period of about 3 hours, a vacuum of 0.5–4 mm. being maintained at the same time. After removal of solvent from the dried methylene chloride extracts, the pressure is reduced to about 0.25 mm., at which pressure the desired lactone, 2-oxa-4-spira-(3,5)-nonanone-1 distills at a boiling point of 47° C. This lactone has a refractive index of 1.4621 at 25° C., and displays a sharp absorption band at 5.48 microns in its infrared spectrum.

What is claimed is:

1. A method for preparing $\beta$-lactones comprising combining a $\beta$-halocarboxylic acid selected from the group consisting of chloro-, bromo- and iodocarboxylic acids, having two inert substituents on the $\alpha$-carbon atom, a high-boiling inert organic liquid and a weakly basic material and heating the mixture at an elevated temperature and at a reduced pressure to produce and distill the lactone from the reaction medium.

2. A method for preparing $\beta$-lactones comprising combining (1) a $\beta$-halocarboxylic acid of the formula

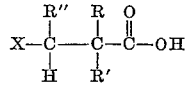

wherein X represents a halogen atom selected from the group consisting of chlorine, bromine and iodine; R and R', which can be the same, represent a member of the group consisting of an aromatic monovalent hydrocarbon radical, a cycloalkyl radical, and a lower alkyl radical, each of up to eight carbon atoms and the halo-, nitro-, and cyano-substituted derivatives of such hydrocarbon radicals, and when taken together with the carbon atom to which they are bonded, may constitute a cyclic structure of up to six ring members and R" represents hydrogen and lower alkyl radicals containing up to six carbon atoms, (2) a high boiling inert organic liquid, and (3) a weakly basic material and heating the mixture at an elevated temperature and at a reduced pressure to produce and distill the lactone from the reaction medium.

3. A method for preparing α,α-dimethyl-β-propiolactone comprising combining a halopivalic acid selected from the group consisting of chloro-, bromo-, and iodopivalic acid, an inert organic liquid having a boiling point at least about 50° C. higher than the lactone and a weakly basic material and heating the mixture at a temperature in the range of about 50 to 200° C. at a reduced pressure in the range of about 0.1 to about 30 mm. whereby the lactone is produced and distilled from the reaction medium.

4. A method for preparing α,α-dimethyl-β-propiolactone comprising combining a halopivalic acid selected from the group consisting of chlorine, bromine and iodine, an ester having a boiling point at least about 50° C. higher than the lactone and a weakly basic material in an amount of at least one equivalent per mol. of halopivalic acid and heating the mixture at a temperature in the range of about 50 to 200° C. at a reduced pressure in the range of about 0.1 to about 30 mm. whereby the lactone is produced and distilled from the reaction medium.

5. A method for preparing α,α-dimethyl-β-propiolactone comprising combining bromopivalic acid, an inert organic liquid having a boiling point at least about 50° C. higher than the lactone and a weakly basic material and heating the mixture at a temperature in the range of about 50–200° C. at a reduced pressure in the range of about 0.1 to about 30 mm. whereby the lactone is produced and distilled from the reaction medium.

6. A method for preparing α,α-dimethyl-β-propiolactone comprising combining chloropivalic acid, an inert organic liquid having a boiling point at least about 50° C. higher than the lactone and a weakly basic material and heating the mixture at a temperature in the range of about 50–200° C. at a reduced pressure in the range of about 0.1 to about 30 mm. whereby the lactone is produced and distilled from the reaction medium.

7. A method for preparing α,α-dimethyl-β-propiolactone comprising combining a halopivalic acid selected from the group consisting of chloro-, bromo-, and iodopivalic acid, an inert organic liquid having a boiling point at least about 50° C. higher than the lactone, and sodium bicarbonate, and heating the mixture at a temperature in the range from about 50–200° C. at a reduced pressure in the range of about 0.1 to about 30 mm. whereby the lactone is produced and distilled from the reaction medium.

8. A method for preparing α,α-dimethyl-β-propiolactone comprising combining a halopivalic acid selected from the group consisting of chloro-, bromo-, and iodopivalic acid, chlorinated biphenyl, and a weakly basic material, and heating the mixture at a temperature in the range of about 50–200° C. at a reduced pressure in the range of about 0.1 to about 30 mm. whereby the lactone is produced and distilled from the reaction medium.

9. A method for preparing α,α-dimethyl-β-propiolactone comprising combining a halopivalic acid selected from the group consisting of chloro-, bromo-, and iodopivalic acid, dialkylphthalate and a weakly basic material, and heating the mixture at a temperature in the range of about 50–200° C. at a reduced pressure in the range of about 0.1 to about 30 mm. whereby the lactone is produced and distilled from the reaction medium.

10. A method of preparing pivalolactone comprising combining β-chloropivalic acid, a high-boiling inert organic liquid and a material selected from the group consisting of an alkali metal carbonate and an alkali metal bicarbonate, and heating the mixture at an elevated temperature and at a reduced pressure to produce and distill the lactone from the reaction medium.

References Cited

UNITED STATES PATENTS

| | | | |
|---|---|---|---|
| 2,977,373 | 3/1961 | Reynolds et al. | 260—343.9 |
| 3,028,399 | 4/1962 | Testa | 260—343.9 |
| 3,062,836 | 11/1962 | Martin | 260—343.9 |

OTHER REFERENCES

Adams: (Ed.) Organic Reactions, Wiley & Sons, New York, vol. VIII (1954), pages 308–312.

Henne et al.: Jour. Amer. Chem. Soc., vol. 58 (1936), page 882.

Simons: Fluorine Chemistry, Academic Press, New York, N.Y., vol. I (1950), page 402.

Zaugg: Jour. Amer. Chem. Soc., vol. 72, (1950), pages 2998–3001.

WALTER A. MODANCE, *Primary Examiner.*

NICHOLAS S. RIZZO, *Examiner.*

JAMES A. PATTEN, *Assistant Examiner.*